US007637710B2

(12) United States Patent
Skutberg et al.

(10) Patent No.: US 7,637,710 B2
(45) Date of Patent: Dec. 29, 2009

(54) INDUSTRIAL ROBOT

(75) Inventors: Hans Skutberg, Östersund (SE); Åsa Vallin, Enskede (SE); Torgny Brogårdh, Västerås (SE); Mathilda Andreasson, Västra Frölunda (SE); Ivan Lundberg, Bromma (SE)

(73) Assignee: ABB AB, Västerås (SE)

( * ) Notice: Subject to any disclaimer, the term of this patent is extended or adjusted under 35 U.S.C. 154(b) by 836 days.

(21) Appl. No.: 10/501,554

(22) PCT Filed: Jan. 16, 2002

(86) PCT No.: PCT/SE02/00075

§ 371 (c)(1),
(2), (4) Date: Jun. 14, 2005

(87) PCT Pub. No.: WO03/059581

PCT Pub. Date: Jul. 24, 2003

(65) Prior Publication Data

US 2006/0104793 A1    May 18, 2006

(30) Foreign Application Priority Data

Jan. 16, 2002    (SE) .................................... 0100135

(51) Int. Cl.
*B25J 17/02*    (2006.01)
(52) U.S. Cl. ...................... 414/735; 74/490.05; 901/15; 901/28
(58) Field of Classification Search ............ 219/121.78, 219/121.82, 121.63–121.71; 414/735, 917, 414/729; 74/490.01, 490.05, 490.06, 490.07; 901/15, 28
See application file for complete search history.

(56) References Cited

U.S. PATENT DOCUMENTS

| 4,569,627 | A | * | 2/1986 | Simunovic | .................. | 414/735 |
| 4,651,589 | A | | 3/1987 | Lambert | | |
| 4,976,582 | A | * | 12/1990 | Clavel | ......................... | 414/729 |
| 5,156,062 | A | * | 10/1992 | Appleberry | ............... | 74/490.01 |
| 5,219,266 | A | * | 6/1993 | Reboulet et al. | ............ | 414/733 |
| 5,698,959 | A | * | 12/1997 | Yanagisawa | ........... | 318/568.11 |
| 5,847,528 | A | * | 12/1998 | Hui et al. | ................. | 318/568.1 |

(Continued)

FOREIGN PATENT DOCUMENTS

DE    19710171 A1 *  9/1998

(Continued)

*Primary Examiner*—Samuel M Heinrich
(74) *Attorney, Agent, or Firm*—Venable LLP; Eric J. Franklin

(57) ABSTRACT

An industrial robot for moving an object in space comprising a stationary platform, a movable platform arranged for supporting the object, and a first, a second and a third arm to which the platforms are joined. The first arm comprises a first actuator, a first supporting arm influenced by the first actuator and being rotatable around a first axis, and a first linkage. The second arm comprises a second actuator, a second supporting arm influenced by the second actuator and being rotatable around a second axis, and a second linkage. The third arm comprises a third actuator, a third supporting arm influenced by the third actuator and being rotatable around a third axis, and a third linkage. The first and third axes are arranged in parallel and the second supporting arm is freely journalled around a transverse axis that is substantially arranged at right angles to the second axis.

5 Claims, 6 Drawing Sheets

U.S. PATENT DOCUMENTS

| | | | | |
|---|---|---|---|---|
| 6,047,610 A | * | 4/2000 | Stocco et al. | 74/479.01 |
| 6,145,405 A | * | 11/2000 | McMurtry et al. | 74/490.07 |
| 6,301,988 B1 | * | 10/2001 | Brogårdh | 74/490.03 |
| 6,540,471 B1 | * | 4/2003 | Brogårdh | 414/729 |
| 6,702,805 B1 | * | 3/2004 | Stuart | 606/1 |
| 6,835,033 B2 | * | 12/2004 | Fioroni | 409/237 |
| 7,011,489 B2 | * | 3/2006 | Brogardh et al. | 414/735 |

FOREIGN PATENT DOCUMENTS

| | | |
|---|---|---|
| FR | 2739801 | 4/1997 |
| JP | 09/186216 | 7/1997 |
| WO | WO 99/14018 A1 | 3/1999 |
| WO | WO9914018 * | 3/1999 |
| WO | WO 99/58301 A1 | 11/1999 |

* cited by examiner

INDUSTRIAL ROBOT

TECHNICAL FIELD

The present invention relates to an industrial robot comprising a manipulator and control equipment where the manipulator has three arms, each arm having a linkage supporting a movable platform. The control equipment comprises drives and means including a microprocessor and software for driving and guiding the manipulator in the desired manner. To achieve the desired movement of the platform, the linkages comprise links or rods that are articulately connected between the platform and the arms. Each joint allows a movement in three degrees of freedom. The arms are fixed to stationary actuators that allow a movement in one degree of freedom. This movement comprises both rotation and translation. The task of the platform is to directly or indirectly support tools or objects for movement, measurement, processing, machining, joining, etc.

BACKGROUND ART

A robot comprising more than one arm and where at least two arms each form chains of joints between the actuators of the robot and the platform that is to be manipulated is called a parallel-arm robot or a parallel-kinematic robot. For a fully extended parallel-arm robot for movement of a platform with three degrees of freedom (e.g. in directions x, y and z in a Cartesian system of coordinates), three parallel-working arms are required. If all six degrees of freedom of the platform (x, y, z and the tool orientation) are to be manipulated, six parallel-working arms are required. Each such arm comprises an upper arm and a lower arm. In several applications, a manipulation with a combination of degrees of freedom for positioning and degrees of freedom for orientation is desired. One class of such applications is interior work in narrow spaces. In that case, it is often desired to have a robot with two degrees of freedom for tool orientation and only one degree of freedom for radial positioning.

To obtain a rigid arm system with a large loading capacity and a low weight, the lower arms of the parallel-kinematic manipulator, nearest the manipulated platform, shall consist of six links in total, which only transfer compressive and tensile forces. For a manipulator with three degrees of freedom and three arms, this means that these six links must be distributed among the arms and this can only be done with two different combinations 2/2/2 or 3/2/1.

To more readily describe parallel-kinematic robots comprising linkages, some definitions of different linkages are introduced here:

Link: A link is a member that movably joins two elements and that, at each end, allows movement in three degrees of freedom. It usually consists of a rigid elongated member such as, for example, a rod that has a ball joint at each end. The link holds the elements at a definite distance from each other and absorbs only tensile or compressive forces. Thus, a link transfers no torsional movements.

Double link: A double link is a member that movably joins two elements, that at each end allows movement in three degrees of freedom, and that transfers a moment in a plane between the elements. The double link consists of a quadrangle with, for example, two links, according to the above, that form a first pair of links and the elements that form the second pair of links. In a special case, the double link is a parallelogram, in which case the two elements are forced to move in parallel with each other. Since all joints allow movement in three degrees of freedom, this implies that the double link may be twisted. Thus, the double link needs help from other linkages to remain plane.

Locked double link: A locked double link is a member that movably joins two elements that, at each end, allows movement in two degrees of freedom. The locked double link consists of a double link according to the above, wherein at least one diagonal is locked. This is achieved, for example, by introducing in the quadrangle an additional link that is not parallel to any of the other links. This prevents the elements from being displaced, but still the locked double link may be twisted.

Triple link: A triple link is a member that movably joins two elements, that at each end allows movement in three degrees of freedom, and that transfers a moment in two planes between the elements. The triple link usually consists of two double links, oriented in different planes, with one common link. In a special case, the triple link comprises a space parallelogram consisting of three parallel links of equal length. Such a space parallelogram may be twisted but maintains the elements oriented in parallel planes.

Triangle: A triangle is a member that movably joins two elements and that at one end (the base) allows movement in one degree of freedom and at its other end allows movement in three degrees of freedom. The triangle consists, for example, of a torsionally rigid member that, at its base, is journalled to a first element through an axis and at its other end is journalled to a second element by means of a ball joint. A triangle may also consist of two links according to the above, where one of the joints is common.

In the following text, an arm for a robot shall mean a linkage supported by a supporting arm. By the concept supporting arm is to be understood a torsionally rigid member that movably joins two elements together and that, at both ends, allow movement in one degree of freedom. The supporting arm consists, for example, of a tube with a fork arranged at each end through which an axle passes. In a special case, the axles are parallel whereby the elements joined by the supporting arm are allowed movement in one plane only. It should be mentioned that the movement comprises rotation as well as translation. The supporting arm may, from one element to the other, transfer both tensile and compressive forces, torsional moment and bending moment.

When a working range in the form of a sphere or an ellipsoid is required, serial kinematics is currently used, wherein the first three joints (axes) are substantially responsible for the positioning of the tool and the other axes (nearest the tool) are substantially responsible for the orientation of the tool. The most commonly used kinematics is thus the following: Axis 1 rotates the whole robot structure, axis 2 rotates a first arm in the vertical plane, axis 3 rotates a second arm, also in the vertical plane, axis 4 rotates the tool around an axis in the centre of the second arm, axis 5 rotates the tool around an axis perpendicular to axis 4, and axis 6 rotates the tool around an axis perpendicular to axis 5. This serial construction of the robot results in the following problems:

The robot becomes heavy, which limits its speed and which necessitates expensive and energy-consuming actuators (motors). If, in addition, the robot is to be mounted as a slave on a master manipulator in order, for example, to guide the robot into narrow spaces, a heavy slave-type robot gives a still heavier and more expensive master manipulator.

The robot becomes pliant and when objects or tools are moved, a undesired oscillating motion is obtained along the path along which the movement is to be made, and when the movement is to be stopped, so-called overshoots arise. This problem is increased further in case of a master/slave configuration, whereby also the performance of the master manipulator is deteriorated.

The robot becomes resilient when forces are to be generated between the tool and the object, which is impaired in a master/slave configuration.

For the serially mounted movable actuators with associated measurement sensors, movable cabling is required, which reduces the reliability of the serially kinematic robots.

It is difficult to obtain a high accuracy of the robot without providing very expensive solutions with precision components and precision assembly of the robot.

Because of temperature-dependent arm lengths and geometrical relations of the serially constructed robot, the tool positioning becomes temperature-dependent.

All of these limitations with currently used serial kinematic robots can be eliminated with a parallel-kinematic robot that is driven by parallel-working linkages, which do not need to support one another.

One example of such a robot is previously known from the patent publication WO99/58301. This robot has, in its basic design, three degrees of freedom and comprises three linkages that are connected in parallel between three rotating actuators and one manipulated platform. Each linkage consists of a pivoting arm, which via two parallel-working articulated rods is connected to the manipulated platform. At both ends of the articulated rods, joints with two or three degrees of freedom are positioned. The parallel kinematic robot thus obtained has a toroidal working range around a base platform, on which the actuators are mounted. The manipulated platform will not change its angle of inclination during the positioning and the extent of the working range above and below the robot is limited by the parallel articulated rods between the lower arms and the manipulated platform. For this reason, the robot cannot be designed for a working range in the form of a sphere or an ellipsoid.

A parallel-kinematic manipulator that is capable of changing the inclination of the manipulated platform and that has a possibility of providing a working range in the form of a sphere or an ellipsoid is described in U.S. patent specification U.S. Pat. No. 4,651,589. Two elements are here connected to at least three legs that are placed in separate planes. The legs each consist of two parts, each part being connected at one end to the other part of the same leg by a spherical connection and at the other end to one of the two elements, however not the element to which the other part of the same leg is connected, by a rotational connection. However, this structure provides a working range that is barely half an ellipsoid and that is therefore not sufficient to build a robot capable of working in all directions with a working range corresponding to a whole ellipsoid or sphere. To sum up, the manipulator disclosed in U.S. Pat. No. 4,651,589 has the following limitations.

A small working range (maximum half an ellipsoid).

Since the legs are working in different planes, all the axes of rotation of the driving motors will have different directions, which makes it impossible to have two parallel or coinciding motor shafts. However, this is necessary for obtaining a simple motor drive that is not space-demanding, which is especially important when the manipulator is to be used as a wrist with transmissions between, on the one hand, motors at one end of a robot arm and, on the other hand, the wrist at the other end of the same robot arm.

The structure is only intended for manipulators with rotating motors that, via pivoting arms, give the manipulated platform its movements. In several applications, it is desirable to use linear actuators without pivoting arms, which is not possible with legs working in different planes.

These limitations, which are fundamental for applications in practice, are not present in the parallel-kinematic robot according to the present invention, which is due the following facts:

Two linkages (corresponding to legs in U.S. Pat. No. 4,651,589) are working in a common plane.

These two linkages may therefore, nearest the manipulated platform, each have a set of articulated rods mounted on the manipulated platform with joints where a line through these joints (called lead line) of one set of articulated rods becomes parallel to the corresponding lead line of the other set of articulated rods.

These parallel lead lines then provide a possibility of having two rotating actuators with parallel or coinciding axes of rotation, which via pivoting arms manipulate the two linkages.

This configuration of the motor shafts provides a possibility of obtaining a working range of +/−180 degrees and even +/−200 degrees, which results in a working range of the robot corresponding to a whole sphere or ellipsoid. No previously known parallel-kinematic structure has such a large solid-angle working range.

In the case of coinciding axes of rotation, in addition, the manipulated platform may be rotated an infinite number of turns around the axis of rotation which is then common to the two motors, which makes it possible always to program the robot to take the nearest path between two positions/orientations of the manipulated platform (it is not necessary to rotate back one turn if, for example, one position lies at the end of a turn and the next position lies at the beginning of the same turn).

Furthermore, with coinciding axes of rotation, these may be driven with coaxial tube transmissions, which enables having the driving motors at one end of a robot arm and the axles for driving the two linkages at the other end of the robot arm.

The parallel lead lines for the two linkages then enable the introduction of a third linkage with a set of articulated rods that has a lead line that is perpendicular to the lead lines of the first two sets of articulated rods.

This in turn provides a possibility of introducing a third motor with an axis of rotation that is perpendicular to the axes of rotation of the other two motors. In this way, a single belt transmission or a tube transmission with a bevel gear pair may be used in a wrist for transmitting motor torque from the motor at one end of the robot arm to the third linkage.

The parallel lead lines for the two sets of articulated rods then provide a possibility of introducing, for the set of articulated rods of the third linkage with a lead line that is perpendicular to the lead lines of the first two sets of articulated rods, three articulated rods, whereby a freely rotatable motor for the third linkage will always be controlled by the other two motors such that the third linkage ends up midway between the other two linkages, which gives an optimal kinematic configuration, both with regard to the magnitude of the working range and the rigidity and performance of the robot.

In addition, the parallel lines for the two linkages provide a possibility of mounting the sets of articulated rods with parallel lead lines on linear actuators to obtain an optimum performance in one plane. By then mounting the third set of articulated rods, with a lead line perpendicular to the other lead lines, on a third linear actuator, either directly or via a pivoting arm, optimum performance are also obtained in space between the linear actuators.

With this parallel-kinematic configuration, a robot is obtained which has all the advantages that are characteristic of a parallel-arm robot with six links to the manipulated platform and which therefore solves the problems for serial arm robots previously described. At the same time, an agility, as great as that of a serial anthropomorphic robot, is imparted to this robot, which implies that it may be used, for example, in narrow spaces. However, the agility enables this robot structure to be utilized in other applications as well. A few examples of areas of applications of parallel-kinematic robots, composed according to the structure described in this patent document, will be given below:

Arc welding, especially in master/slave configurations, for example in ships' modules.

Spot welding, for example in wheel housings.

Gluing, cementing, painting, for example inside engine compartments, boots, fuselages.

Assembly, for example inside car bodies in a master/slave configuration.

Measurement, for example in engine blocks, gearbox casings and car bodies.

Grinding, deburring, milling, boring, etc., for example in engine blocks, gearbox casings, certain casting.

Laser cutting, water cutting, for example in car and aircraft components.

Machining, where the robot is used for inserting and withdrawing objects in various types of machines, for example multi-operation machines, foundry machines, punches and high-pressure presses.

SUMMARY OF THE INVENTION

The object of the present invention is to suggest ways and means of producing a parallel-kinematic robot that exhibits a large working range and that prevents the arms of the robot from being subjected to unfavourable forces. This is achieved by an industrial robot with a manipulator comprising a stationary element, a movable element and three arms interconnecting the elements, each arm having a supporting arm and a linkage supported by the supporting arm, the movement plane of a central arm being adapted to intersect the movable element upon all movements.

From a first aspect of the invention, the manipulator comprises a linkage that allows the movable element a movement in space along a spheroid where the radius is varied and with rotatable arms. From a second aspect of the invention, the manipulator comprises a linkage that allows the same movement but with supporting arms, the movement of which involves translation. In a special case, a straight linear translation is referred to.

The manipulator, which is common from all aspects, comprises a first supporting arm, a second supporting arm, and a third supporting arm. The second supporting arm will be referred to below also as the central supporting arm. Besides being journalled about a first axis, around which the drive system is arranged, this central supporting arm is also freely journalled about a second axis arranged substantially in a normal plane to the drive shaft. The method for imparting to the central arm only small transverse forces comprises adapting the central arm, by connections to the other arms, to adopt a position in between these.

The invention comprises robots that are composed of a parallel-kinematic arm system driven by actuators. The arm system comprises three parallel-working linkages (A, B, C) connecting the actuators (10, 11, 12B) to the platform (31) that is to be manipulated. Nearest the manipulated platform (31), the linkage comprises articulated rods (16, 17, 18, 19, 20, 21) and it is the configuration of these articulated rods together with the configuration of the actuators (10, 11, 12) and the manipulated platform (31) that gives the robot its unique properties. To lock all of the six degrees of freedom of the manipulated platform, a total of at least six articulated rods are used. In this way, each articulated rod will only need to transmit tensile and compressive forces, which enables the articulated rods to be made very rigid, light and accurate.

The linkages are mounted on the platform (31) by means of joints (23, 24, 26, 27, 29, 30) having one, two or three degrees of freedom. The articulated rods are distributed such that each linkage comprises at least two articulated rods for forming sets of articulated rods (16, 17; 18, 19; 20, 21). To obtain as small forces as possible in the articulated rods with respect to torques of the platform (31), those joints that have the same linkages are mounted as far away from each other as possible on the platform. A set of articulated rods associated with the same linkage is mounted with a set of joints (23, 24; 26, 27; 29, 30) on the manipulated platform (31). At the other end, the articulated rods of at least two of the three sets of articulated rods (16, 17; 18, 19) are mounted on a common joint (22, 25). In the case where the joints between one set of articulated rods and the platform only have one degree of freedom, the axes of rotation of those joints (23, 24; 26, 27; 20, 21) that belong to the same set of articulated rods are to coincide. The common joint (22, 25, 28) for a pair of articulated rods shall have two or three degrees of freedom and the two or three axes of rotation of a common joint should coincide in order that the kinematic model of the robot shall not be too complex. To obtain the most favourable load picture in the common joint, those articulated rods that are mounted thereon should point inwards towards the centre of the joint, where the two or three axes of rotation intersect each other.

The common joint (22, 25, 28) for a set of articulated rods may be mounted either on a pivoting arm (13, 14, 15) or on a carriage (40, 41, 42) moving along a path (3A, 3B). The pivoting arms and the carriages are driven by actuators (10, 11, 12) which, via the three linkages (A, B, C), give rise to a combined transfer and rotary movement of the manipulated platform (31).

Based on this fundamental design of a parallel-kinematic robot, the invention comprises a number of advantageous embodiment.

The inventive comprises the feature that in two of the three sets (16, 17; 18, 19) of articulated rods, the links included are mounted on pivoting arms (13, 14) with the aid of a joint (22, 25) which is common to each set of articulated rods. At their other ends, the two sets (16, 17; 18, 19) of articulated rods are mounted on a platform (31) by means of joints in such a way that those joints (23, 24) which belong to one (16, 17) of the sets of articulated rods are positioned on a line that is parallel to the corresponding line through the joints (26, 27) of the other (18, 19) of the two sets of articulated rods. The inventive concept also comprises the feature that these lines may be coinciding, which implies that the joints (23, 24, 26, 27) of both sets of articulated rods towards the platform (31) are mounted along one and the same line.

Further, the above-mentioned parallel or coinciding lines are parallel to the axes of rotation of the arms (13, 14) on which the two sets (16, 17; 18, 19) of articulated rods are mounted. These axes of rotation are the same as the axes of rotation of those actuators (10, 11) that drive these arms (13, 14). Further, in this embodiment, the third linkage (C) is mounted between a third actuator (12B) and the platform (31). The axis of rotation of the third actuator (12B) is chosen essentially perpendicular to the axes of rotation of the other two actuators (10, 11), which causes the third arm (15) to swing in a plane perpendicular to the plane in which the two previously mentioned arms (13, 14) are swinging.

The inventive concept also comprises the feature of having the third actuator (12B) freely pivoting on the column (13) by means of a bearing (12A), the axis of rotation of which preferably coincides with the axes of rotation of the first two actuators (10, 11). By then introducing a seventh articulated rod (21C) to the platform (31), the degree of freedom added through said bearing (12A) may be locked. This seventh articulated rod is suitably introduced in the third set of articulated rods (20, 21, 21C), which is positioned between the third pivoting arm (15) and the platform (31). The third linkage (C) is configured such that at most two out of three articulated rods included in the set of articulated rods become parallel. To prevent rotations of the platform (31) when the third arm (15) is swinging, the line through the joints (29, 30C, 30) connecting the third set of articulated rods (20, 21, 21C) to the platform (31) should be parallel to the line through the joints (28A, 28C, 28B) connecting the third set of articulated rods (20, 21, 21C) to the third arm (15) and, at the same time, parallel to the axis of rotation of the third arm (15) and the third actuator (12B). At the same time, this design will cause the platform (31) to rotate the third actuator (12B) on the bearing (12A) on the column 3, such that the third arm (15) will always swing in a plane that is perpendicular to the plane in which the first two arms (13, 14) are swinging and, in addition, the third arm (15) will always be situated midway between the first two arms (13, 14), which provides a maximum working range for the robot.

The invention also comprises mounting the third actuator (12C) on another actuator (12D) that is capable of rotating the third actuator around an axis that is essentially perpendicular to the axis of rotation of the second actuator (12D).

It is also part of the inventive concept that at least two of the sets (16, 17; 18, 19) of articulated rods are mounted by means of said common joints (22, 25) on carriages (40, 41) and that the manipulated platform (31) is caused to move by controlling the positions of said carriages with the aid of the actuators (10, 11). To avoid rotation of the platform (31), the two sets (16, 17; 18, 19) of articulated rods are mounted on the platform (31) by means of joints (23, 24; 26, 27) in such a way that a line (lead line) through the joints (23, 24) belonging to one (16, 17) of the two sets of articulated rods becomes parallel or coincides with a corresponding line (lead line) through the joints (26, 27) belonging to the other (18, 19) of the two sets of articulated rods. Further, said two carriages (40, 41) are suitably mounted such that the movements of thereof are carried out in a plane perpendicular to the above-mentioned lead lines in a position when the platform (31) is approximately in the centre of its working range. To obtain a well utilized working range, these carriages should, in addition, move along mutually parallel paths.

It is also part of the inventive concept to form the third set of articulated rods (20, 21) either in the form of a parallelogram with two joints at each end of the articulated rods or in the form of a parallelepiped with two joints at each end of the articulated rods or in the form of an equilateral triangle or in the form of three articulated rods, of which at most two may be parallel. The articulated rods (20, 21) included in the third set of articulated rods are mounted by joints (29, 30) on the platform (31) such that a line between these joints becomes perpendicular to the above-described parallel lines for the joints between the first two sets (16, 17; 18, 19) of articulated rods and the platform (31). In that way, rotation of the platform (31) is avoided when the platform is manipulated.

According to the invention, for obtaining a large working range of the embodiment of the robot with carriages (40, 41, 42), the third set (20, 21) of articulated rods may be mounted on a lever-arm arrangement (15, 46, 44, 45) connected to the second and third carriages (41, 42). The task of the lever-arm arrangement (45, 44, 46, 15) is to impart large movements to the set (20, 21) of articulated rods that is to move the manipulated platform (31) substantially perpendicular to the direction of movement of the carriages (40, 41, 42). Further, to obtain a maximum working range, the linear paths (3A, 3B), on which the carriages are moving, are parallel and mounted such that the linkages (16, 17; 18, 19; 20, 21) are able to move between the linear paths.

The inventive concept also comprises mounting on the manipulated platform (31) a wrist with one, two or three axes. The inventive concept also comprises using the robot as a slave robot to carry out various operations inside a more or less closed space (1). As a slave robot, the robot may also be used as a wrist for a larger robot, in which case the movements of the robot are synchronized to the movements of the larger robot.

BRIEF DESCRIPTION OF THE DRAWING

The invention will be explained in greater detail by means of embodiments with reference to the accompanying drawing wherein.

DESCRIPTION OF THE PREFERRED EMBODIMENT

Figure 1:
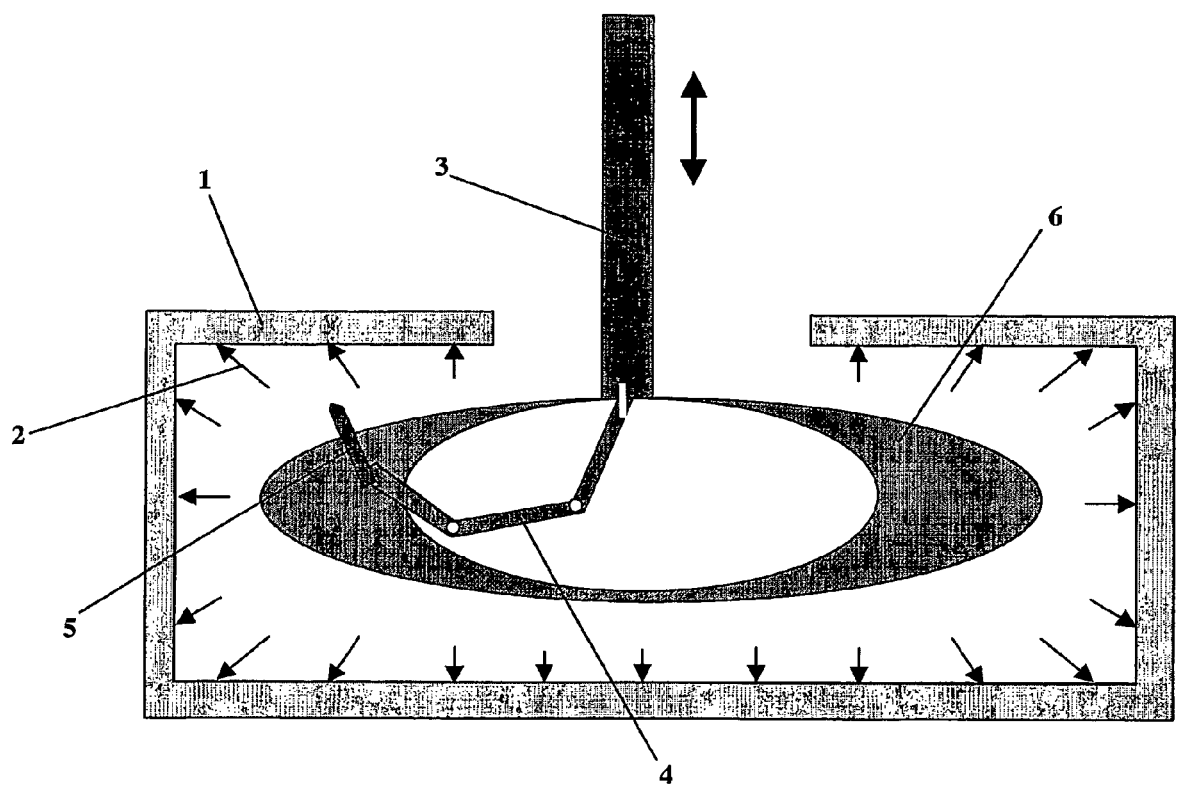
FIG. 1 shows the type of working range (6) for which the robot is especially suited.

FIG. 1 schematically shows a frequently occurring case when using industrial robots in a more or less closed space. The space is limited according to the figure by walls 1, on the inside of which operations such as welding, painting, grinding, cutting, measurement, machining, assembly, etc., are to be carried out, as indicated by the arrows 2. To move the robot 4 into the space in question, there is used an external manipulator with a column structure 3, which is capable of being manipulated at least up and down. To enable the robot to move the tool 5 to the positions and orientations shown by the arrows 2, a spherically or elliptically shaped working range 6 for the robot is required. In addition, the kinematics of the robot should be designed such that the tool holder, on which the tool 5 is mounted, points approximately radially outwards from the spherical/elliptical working range 6. In that way, less demands will be made on the accessibility of the wrist that is to direct the tool 5 according to the arrows 2. As indicated in the figure, a conventional robot of serial type with so-called backward bending may be used. However, such a robot has a plurality of disadvantages, for example a high weigh, low accuracy (absolute, relative, temperature dependence), considerable pliancy, long cycle times (low acceleration, speed), and environmental sensitivity. To overcome these disadvantages, a parallel-kinematic robot may be used. However, the special requirement for the working range requires an entirely new type of parallel kinematics.

Figure 2:
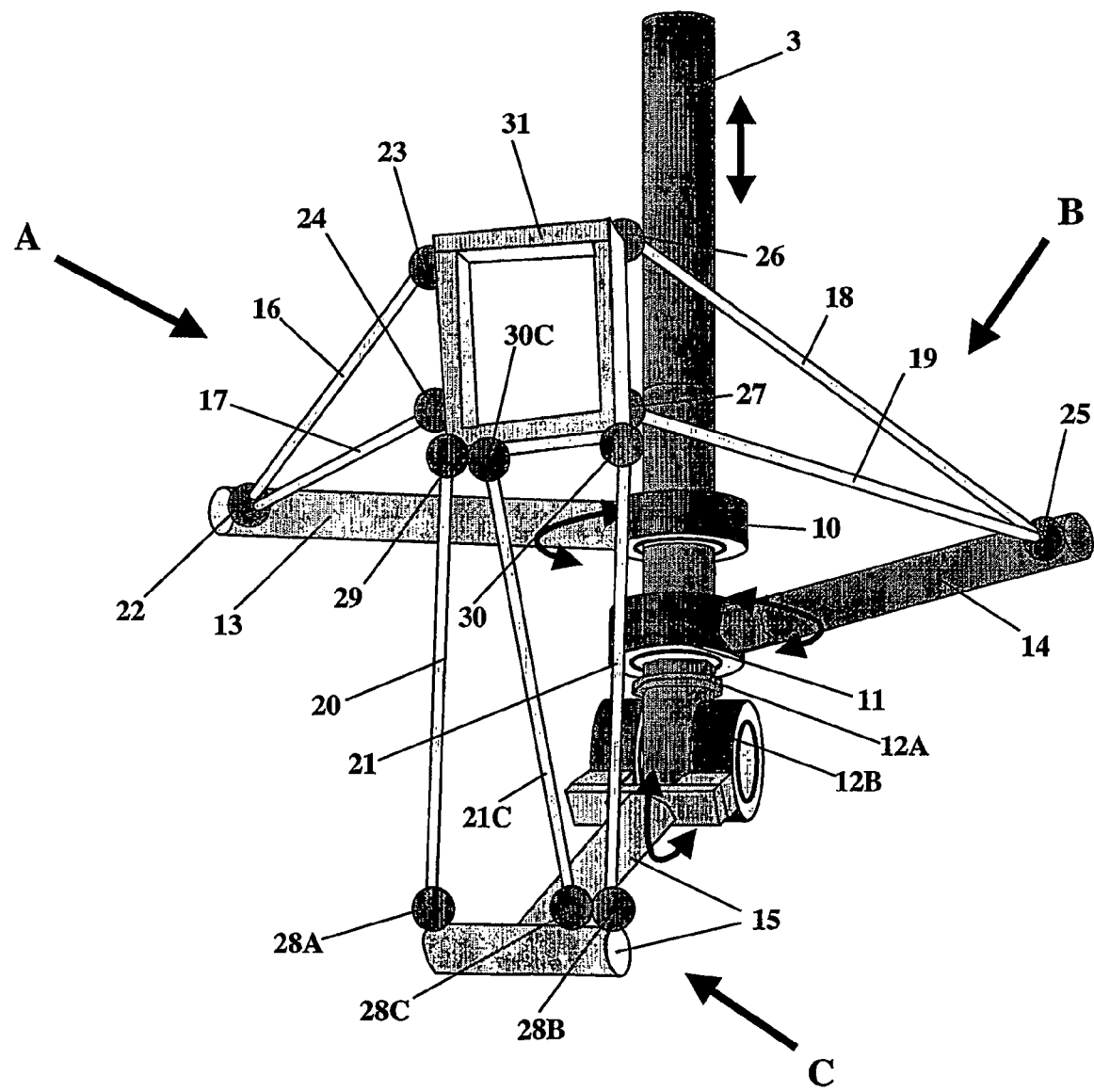
FIG. 2 shows a robot according to the invention with three pivoting arms, wherein two of the axes of rotation of the pivoting arms coincide so as to give the robot a working range corresponding to a whole ellipsoid or a sphere according to FIG. 1.

FIG. 2 shows an embodiment of a parallel-kinematic industrial robot according to the invention, which meets the kinematic requirements that are placed for an application with a working range according to FIG. 1. The column 3, which is used to lower the robot into the space where is it to operate, at the same time constitutes the base structure of the robot, on which the actuators 10 and 11 are mounted. The actuator 12B is articulately connected to the column 3 via the horizontal bearing 12A, which has its axis of rotation coinciding with the centre line of the column 3. The tool and the wrist, which are not shown in the figure, are mounted on the manipulated platform 31. This platform is manipulated by the actuators 10, 11 and 12 with the aid of three linkages A, B and C. The linkage A for the actuator 10 comprises the lower arm 13, the joint 22, the links 16 and 17, and the joints 23 and 24 that are mounted on the manipulated platform 31. In a corresponding way, the linkage B for the actuator 11 comprises the lower arm 14, the joint 25, the links 18 and 19, and the joints 26 and 27, and the linkage C for the actuator 12B comprises the lower arm 15, the joints 28A, 28B and 28C, the links 20, 21 and 21C as well as the joints 29, 30 and 30C. The joints 22 and 25 may be designed with two or three degrees of freedom and the joints 23, 24, 26, 27, 28A, 28B, 28C, 29, 30 and 30C may be designed with one, two or three degrees of freedom. In the case of one degree of freedom, the axes of rotation of the joints belonging to the same linkage must have coinciding parallel axes of rotation. In the case of two degrees of freedom, cardan joints or other angularly adjusted joint configurations may be used, and in the case of three degrees of freedom, universal joints or ball joints may be used. To prevent stresses from being built into the robot structure, for each articulated rod the joints at one end should have three degrees of freedom and the joints at the other end should have two or three degrees of freedom. If an extremely light and fast robot is desired, all the joints on the platform should be designed in the form of ball joints. The joints 22 and 25 constitute a special case, the task of these joints being to impart to the articulated rods 16, 17 and 18, 19, respectively, common axes of rotation relative to the arms 13 and 14, respectively. In the case of ball joints, this can be achieved in the simplest way by mounting two articulated rods on the same ball or socket. The mounting is preferably performed such that the articulated rods point inwards towards the centre of the ball joint. In the case of a universal joint or a cardan joint, the two articulated rods are suitably mounted on the same bearing housing and in such a way that they point inwards towards the kinematic centre of the joint.

When the actuator 12B is rotated, the lower arm 15 will manipulate the platform 31, via the links 20, 21 and 21C, up and down in the figure. This movement of the platform will be a circular movement around the axis given by the connecting line between the centre of the joint 22 and the centre of the joint 25. If the joints 22 and 25 can manage sufficiently large angular deflections (which is obtained in a simple manner with universal joints), the platform 31 may be turned round more than 180 degrees by the lower arm 15. By then changing the angle between the lower arms 13 and 14 by means of the actuators 10 and 11, the connecting line between the centre of the joint 22 and the centre of the joint 25 will be moved in the radial direction relative to the column 3, which results in a corresponding translation of the circular movement of the platform 31, which in turn gives rise to an elliptic working range of the robot. Then, if the lower arms 13 and 14 are turned synchronously in the same direction, the elliptic working range will be obtained in all directions radially out from the centre of the column 3. This presupposes that the actuator 12B is turned round on the bearing 12A such that the arm 15 is always situated between the arms 13 and 14. That this is a fact is guaranteed by the link structure in the linkage C. By angularly adjusting at least one articulated rod (21C), the arms 13 and 14 will rotate the arm 15, via the platform 31 and the links 20, 21 and 21C, such that the arm always ends up midway between the arms 13 and 14. In this way, a working range in the form of a complete ellipsoid is obtained around the column 3, which is the requirement made according to FIG. 1.

To prevent the platform 31 from rotating around its normal when being manipulated, the joints 23 and 24 are mounted on a line that is parallel to a line through the joints 26 and 27. These lines are then parallel to the axes of rotation of the actuators 10 and 11. To obtain a symmetrical working range, in addition, the axes of rotation of the actuators 10 and 11 should coincide. A further requirement to prevent rotations of the platform around its normal is that a line through the joints 29, 30C and 30 is parallel to a line through the joints 28A, 28C and 28B (mounted on a T-structure of the arm 15), which in turn is parallel to the axis of rotation of the actuator 12B. In order for the arm 15 always to be situated midway between the arms 13 and 14, it is further required that the axis of rotation of the actuator 12B be perpendicular to the axes of rotation of the actuators 10 and 11. This in turn means that the line through the joints 29, 30 and 30C is perpendicular to the line through the lines 23 and 24 and the line through the joints 26 and 27.

To reduce the weight of the robot, the actuators (suitably the motors with gearing) for rotating the arms around may be located at the upper part of the column 3, whereby, for example, tube transmissions are used for bringing the rotational movements down to the lower arms. It would then be possible to regard the robot as a wrist for the manipulator that brings the robot down into the space in which the robot is to work. In cases where it is desired to have a rigid and light wrist for a conventional robot or for a parallel-arm robot, the kinematic structure in FIG. 2 could be directly applicable.

Figure 3:
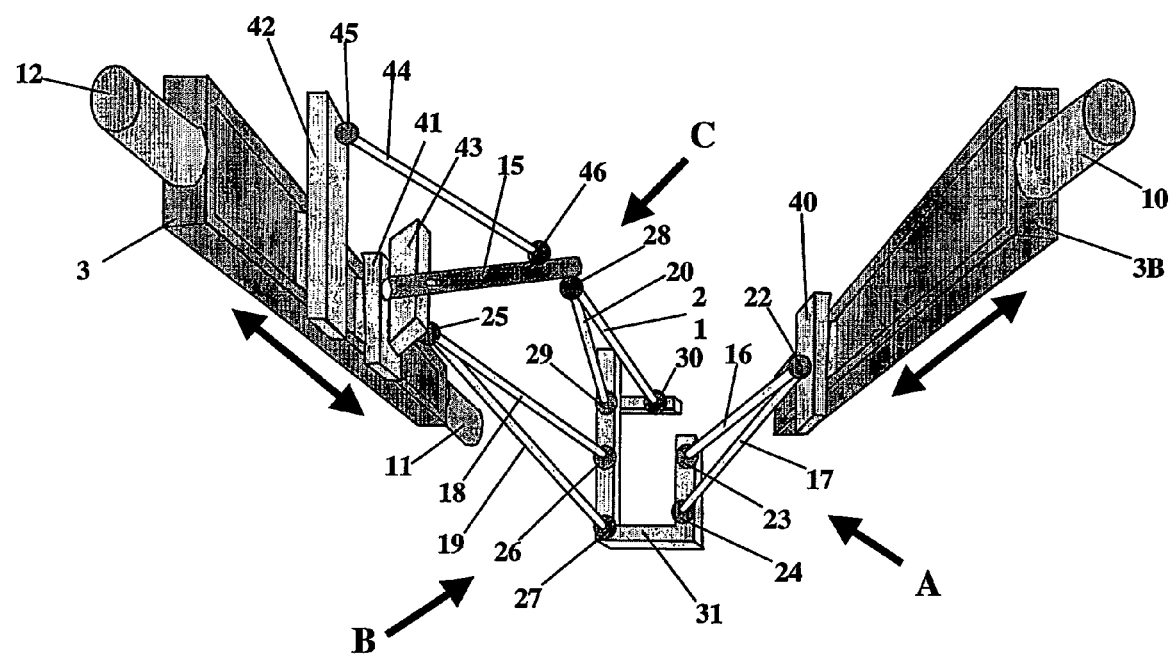
FIG. 3 shows a robot according to the invention with two linear tracks, on which three carriages are guided so as to obtain a gantry-like robot with an elongated working range, wherein the front and rear parts of the working range have the shape of half an ellipsoid or half a sphere, FIG. 4 show a robot according to the invention with three pivoting arms, wherein two of the axes of rotation of the pivoting arms coincide and wherein the manipulated platform comprises two angularly adjusted axles. On one axle, four of the platform joints are mounted with a coinciding axis.

FIG. 3 shows an embodiment in which the column for lowering the robot into the space in question is replaced by two linear tracks 3A and 3B, which are mounted in parallel with each other. On these tracks 3 there are three carriages 40, 41 and 42, which are driven by the actuators 10, 11 and 12, respectively. The propulsion may be performed by means of ball screws or belts, but another possibility is to use linear motors. The three linkages A, B and C are here connected to the carriages 40, 41 and 42. Thus, the joint 22 is mounted on the carriage 40, the joint 25 on the carriage 41 and the joint 28 on the carriage 42 via the arm 15, the joint 46, the link 44 and the joint 45. This arrangement for the joint 28 is used to obtain a pivoting movement of the arm 15, which is articulately fixed to the stand 43, which is mounted on the carriage 41. When the carriages 42 and 41 move relative to each other, the arm 15 will carry out a pivoting movement, which imparts a circular movement to the platform 31 around the line connecting the joint 25 to the joint 22. This line may then be transferred and rotated by moving the carriages 40 and 41 relative to each other, which causes an ellipsoidal movement pattern.

To avoid rotations of the platform 31 around its normal when the platform is manipulated, certain requirements are made on the linkages A, B and C. Thus, the joints 23 and 24 and the joints 26 and 27 must be mounted on the platform 31 in such a way that a lead line through the lines 23 and 24 becomes parallel to a corresponding lead line through the lines 26 and 27. These lead lines must then both be perpendicular to a line through the lines 29 and 30. Further, it is desirable for the carriages 40 and 41 to move along a common plane or along parallel planes and for the movement paths of the carriages to be parallel.

With regard to linkage C, the joint 28 may either be mounted directly on the carriage 42 or, as in FIG. 3, on a lever arm 15, which is articulately mounted on the stand 43. The arm 15 may, of course, be driven by a rotating actuator that is mounted on the carriage 41, but in that case movable cabling may be used for feeding and controlling the actuator 12. One advantage of the arrangement of FIG. 3 is that the actuators 10, 11 and 12 are all fixedly mounted and that therefore no movable cabling is required, which provides a higher reliability and a lower cost.

Figure 4:
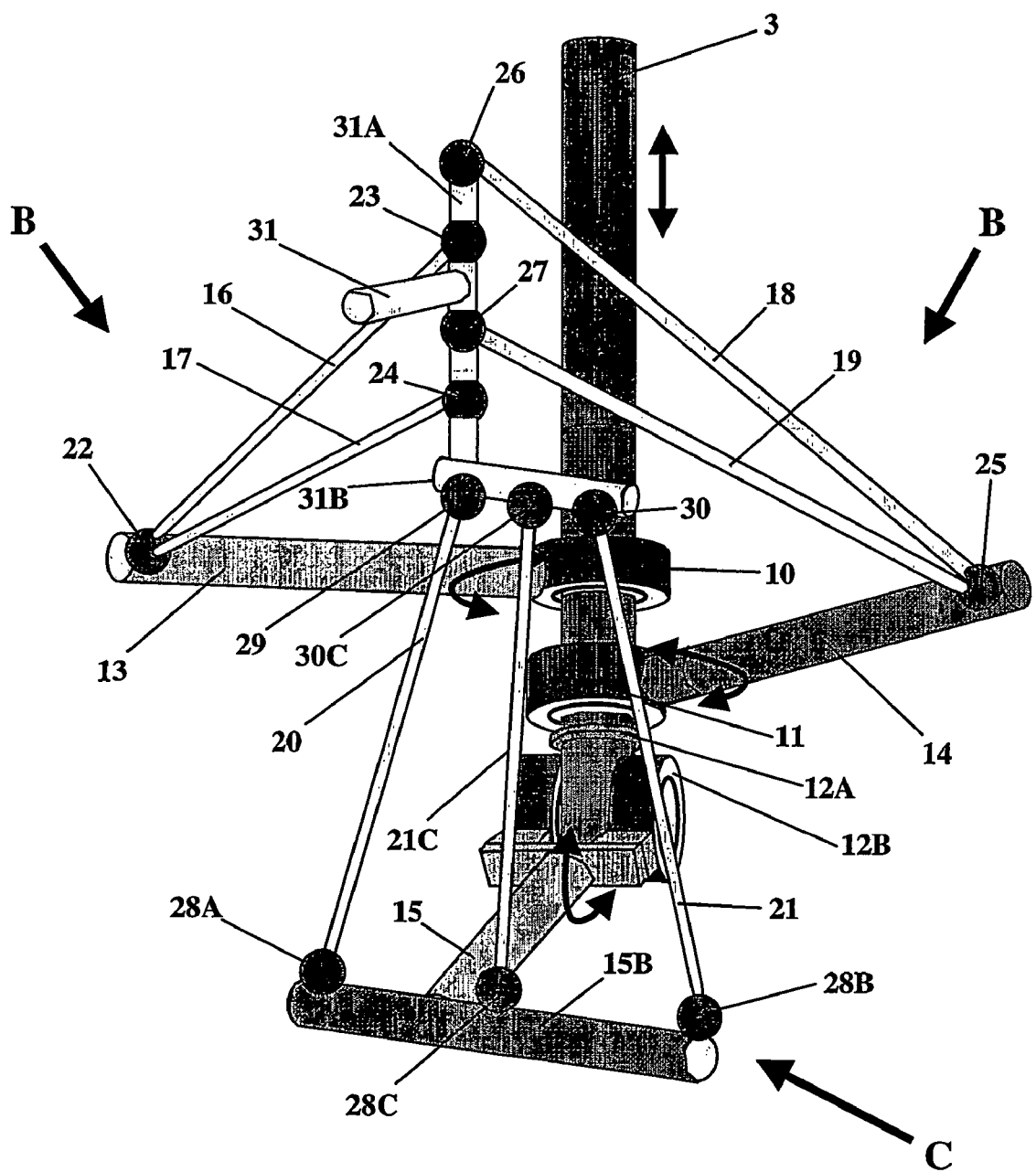

FIG. 4 shows a variant of FIG. 2, with the difference that here the joints 23, 24 and 26, 27, respectively, are not only mounted in parallel on the platform 31 but also mounted along a straight line. This provides a possibility of designing a simple platform, which only consists of two angularly adjusted axles 31A and 31B, on which ball or roller bearings are mounted. The vertical axle 31A, on which the joints 23, 24, 26 and 27 are mounted, is suitably parallel to the column 3 and hence parallel to the axes of rotation of the actuators 10 and 11 whereas the angularly adjusted axle 31B is suitably mounted in the horizontal plane perpendicular to the vertical axis and parallel to the axis of rotation of the actuator 12B.

When the actuator 12B is rotated, the lower arms 15 will manipulate the platform 31 up and down in the figure via the links 20, 21 and 21C. This movement of the platform will be a circular movement around the axis given by the connecting line between the centre of the joint 22 and the centre of the joint 25. Then, by changing the angle between the arms 13 and 14, by means of the actuators 10 and 11, the connecting line between the joint 22 and the centre of the joint 25 will be moved in a radial direction relative to the column 3, which causes a corresponding translation to be imparted to the circular movement of the platform 31, which in turn gives rise to an elliptic working range of the robot.

Then, if the lower arms 13 and 14 are rotated synchronously in the same direction, the elliptic working range will be obtained in all directions radially outwards from the centre of the column 3. This presupposes that the actuator 12B is rotated around on the bearing 12A such that the arm 15 will always be situated between the arms 13 and 14. That this is the case is guaranteed by the link structure of the linkage C. This linkage comprises three articulated rods 20, 21C and 21, which are not parallel to one another, contrary to the corresponding link structure in FIG. 2, where two articulated rods are parallel. The object of this three-link structure, besides locking two degrees of freedom of the platform, is also to lock the degree of freedom that arises in the joint 12A. Thus, the three links 20, 21C and 21 causes the arms 13 and 14 via the platform 31 and the linkage C to rotate the actuator 12B around the joint 12A such that the arm 15 will always end up midway between the arms 13 and 14. In this way, a working range is obtained in the form of a complete ellipsoid around the column 3, which is the requirement made according to FIG. 1. The three articulated rods 20, 21C and 21 are mounted between the transverse platform axle 31B and the rod 15B on the arm 15. This mounting is made such that a line through the joints 29, 30C and 30 is parallel to a corresponding line through the joints 28A, 28C and 28B and such that these lines are parallel to an axis of rotation of the actuator 12B. Further, these lines are perpendicular to the axes of rotation of the actuators 10 and 11.

To prevent the platform 31 from rotating around its normal when being manipulated, the joints 23 and 24 are mounted on a line that is parallel to a line through the joints 26 and 27. These lines are then parallel to the axes of rotation of the actuators 10 and 11. To obtain a symmetrical working range, the axes of rotation of the actuators 10 and 11, should, in addition, coincide.

Figure 5:
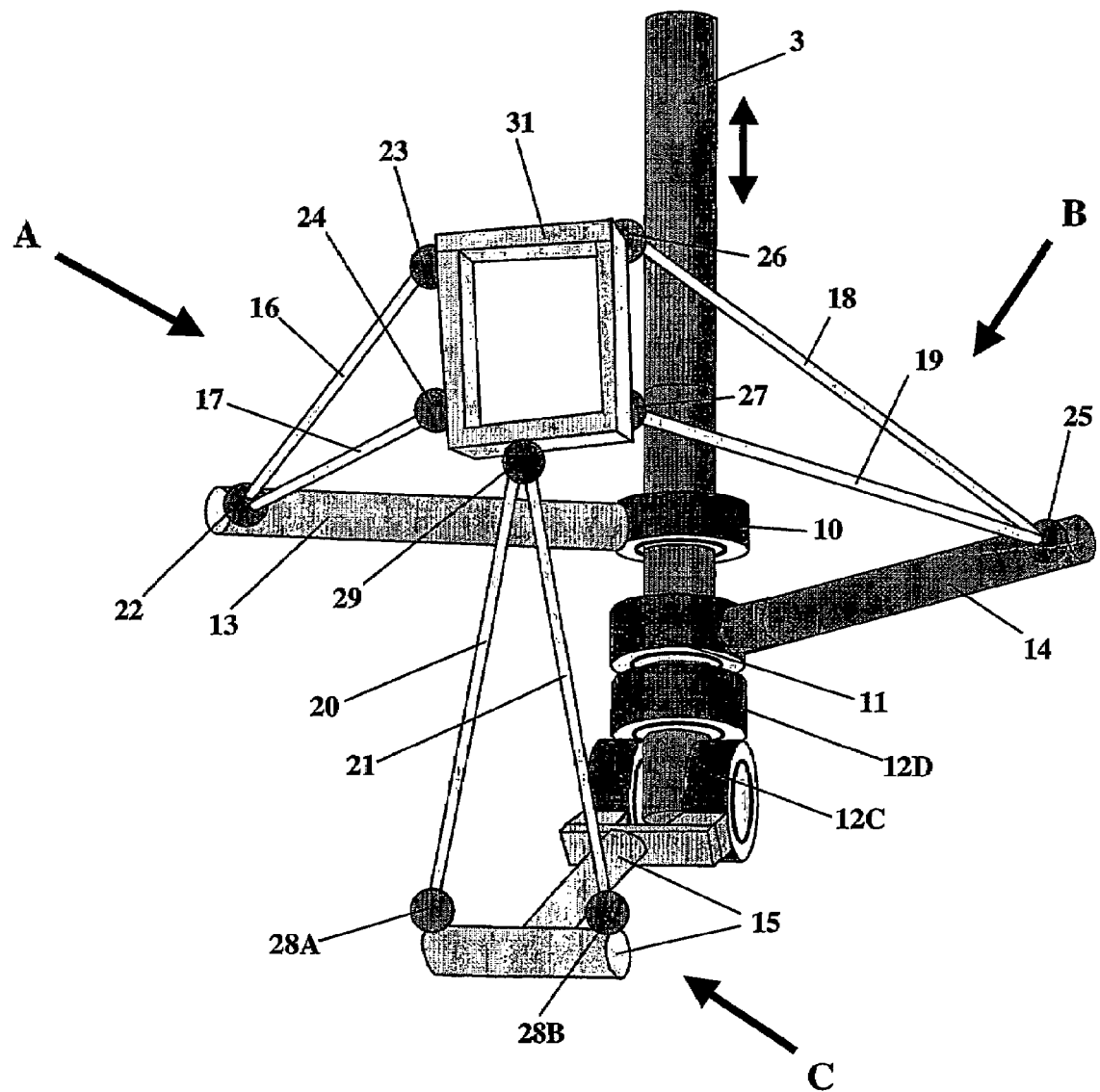
FIG. 5 shows a robot according to the invention with four motors to impart an extra degree of freedom of rotation to the manipulated platform.

FIG. 5 shows another variant of the robot structure in FIG. 2. Here, the bearing 12A is replaced by a rotating actuator 12D, which is capable of rotating the actuator 12C around an axis perpendicular to the axis of rotation of the actuator 12C and coinciding with a centre line of the column 3. This fourth actuator provides a possibility of imparting to the platform 31 a fourth degree of freedom, capable of being manipulated, which consists of a rotational movement around an axis extending through the joint 29. The joint 29 is, in this structure, common to the articulated rods 20 and 21, which at its other end is mounted with the joints 28A and 28B, respectively, on the arm 15.

When the actuators 10 and 11 rotate the arms 13 and 14, respectively, a radially directed movement, as roughly viewed from the column 3, will be imparted to the platform 31. When the actuator 12C rotates the arm 15, roughly viewed an upward/downward movement will be imparted to the platform, and when the actuator 12D rotates the actuator 12C, a rotation of the platform 31 around an axis extending through the joint 29 is obtained. The joint 29 has three degrees of freedom and the joints 28A and 28B have one, two or three degrees of freedom. In the case of one degree of freedom, the joints 28A and 28B are mounted such that the axes of rotation of these joints coincide and become parallel to the axis of rotation of the actuator 12C.

Figure 6:
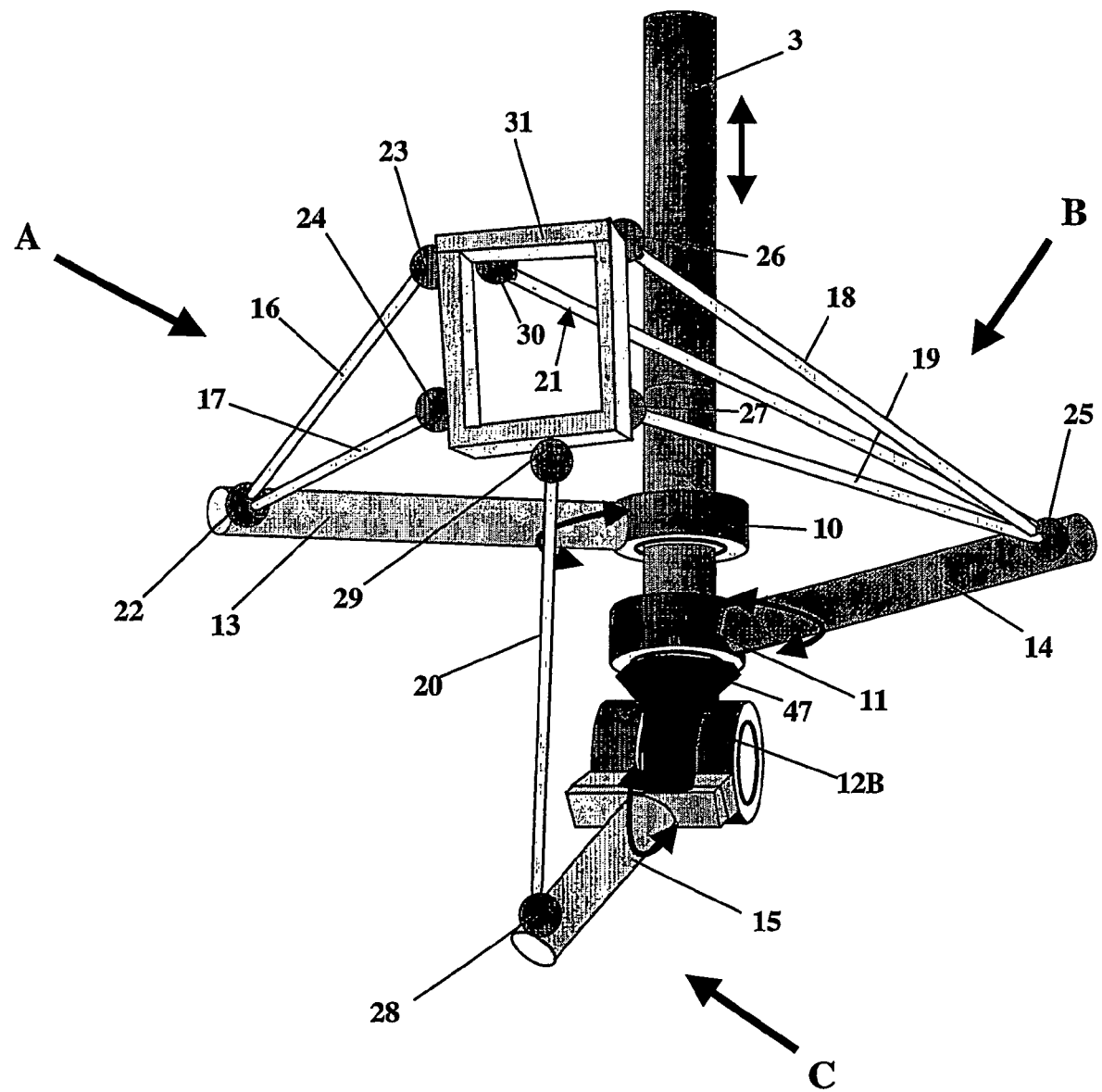
FIG. 6 shows an alternative to the configuration of the articulated rods for the movable platform 31.

FIG. 6 shows an alternative to the configuration of the articulated rods for the movable platform 31. Here, one articulated rod (21) has been moved from the upper arm 15 to the upper arm 14 and one articulated rod has been removed from the lower arm 15, which is now only connected to the lower arm via a link (21C). At the same time, the bearing 12A has been removed and the actuator 12B is now rotated round by the actuator 11 through the fixed coupling 47. The three links 18, 19 and 21 now have a common joint 25 to the upper arm 14. In this design, the joints 26, 27 and 30 may also be eliminated (no degrees of freedom between the links 18, 19, 21 and the platform 31). It should be pointed out here that also the joints 24 and 23 may be simplified and implemented with one degree of freedom along a common axis. This latter simplification may, of course, also be made possible for the triangular arrangements of links in the other figures.

The invention comprises robots that are composed of a parallel-kinematic arm system driven by actuators. The arm system comprises three parallel-working linkages A, B, C, connecting the actuators 10, 11, 12B to the platform 31 to be manipulated. Nearest the manipulated platform 31, the linkages comprise articulated rods 16, 17, 18, 19, 20, 21 and it is the configuration of these articulated rods together with the configuration of the actuators 10, 11, 12 and the manipulated platform 31 that gives the robot its unique properties. To lock all of the six degrees of freedom of the manipulated platform, a total of at least six articulated rods are used. In this way, each articulated rod will only need to transmit tensile and compressive forces, which enables the articulated rods to be made very rigid, light and accurate.

The articulated rods are mounted on the platform 31 with the aid of joints 23, 24, 26, 27, 29, 30 that have one, two or three degrees of freedom. The articulated rods are distributed such that each linkage comprises at least two articulated rods to form sets of articulated rods 16, 17; 18, 19; 20, 21. To obtain as small forces as possible in the articulated rods with respect to torsional moments of the platform 31, those joints which belong to the same linkage are mounted on the platform as far away from each other as possible. A set of articulated rods belonging to the same linkage is mounted with a set of joints 23, 24; 26, 27; 30, 31 on the manipulated platform 31. At the other end, in at least two of the three sets of articulated rods, 16, 17; 18, 19, the articulated rods are mounted on a common joint 22, 25. In the case where the joints between a set of articulated rods and the platform only have one degree of freedom, the axes of rotation of those joints 23, 24; 26, 27; 20, 21 which belong to the same set of articulated rods shall coincide. The common joint 22, 25, 28 for a pair of articulated rods shall have two or three degrees of freedom and the two or three axes of rotation of a common joint should coincide in order that that kinematic model of the robot shall not be too complex. To obtain the most favourable load picture in the common joint, the articulated rods that are mounted thereon should point inwards towards the centre of the joint, where the two or three axes of rotation intersect one another.

The common joint 22, 25, 28 for a set of articulated rods may be mounted either on a pivoting arm 13, 14, 15 or on a carriage 40, 41, 42 moving along a path 3A, 3B. The pivoting arms and the carriages are driven by actuators 10, 11, 12 which, via the three linkages A, B, C, give rise to a combined transfer and rotational movement of the manipulated platform 31.

Based on this basic design of a parallel-kinematic robot, the invention comprises a number of advantageous embodiments.

The inventive concept comprises mounting, in two of the three sets of articulated rods, 16, 17; 18, 19, the links included on pivoting arms 13, 14 with the aid of a joint 22, 25 that is common to each set of articulated rods. At their other ends, the two sets of articulated rods 16, 17; 18, 19 are mounted on a platform 31 with joints in such a way that those joints 23, 24 which belong to one of the sets of articulated rods 16, 17 are positioned on a line that is parallel to a corresponding line through the joints 26, 27 of the other 18, 19 of the two sets of articulated rods. It is also part of the inventive concept that these lines may coincide, which means that the joints 23, 24, 26, 27 of both sets of articulated rods towards the platform 31 are mounted along one and the same line.

Further, the above-mentioned parallel or coinciding lines are parallel to the axes of rotation of those arms 13, 14 on which the two sets of articulated rods 16, 17; 18, 19 are mounted. These axes of rotation are the same as the axes of rotation of the actuators 10, 11 that drive these arms 13, 14. Further, in this embodiment, the third linkage C is mounted between a third actuator 12B and the platform 31. The axis of rotation of the third actuator 12B is chosen essentially perpendicular to the axes of rotation of the other two actuators 10, 11, which causes the third arm 15 to swing in a plane perpendicular to the plane in which the two previously mentioned arms 13, 14 are swinging.

The inventive concept also comprises having the third actuator 12B freely pivoting on the column 13 by means of a bearing 12A, the axis of rotation of which preferably coincides with the axes of rotation of the first two actuators 10, 11. By then introducing a seventh articulated rod 21C for the platform 31, the degree of freedom added through this bearing 12A may be locked. This seventh articulated rod is suitably introduced in the third set of articulated rods 20, 21, 21C that is located between the third pivoting arm 15 and the platform 31. The third linkage C is configured such that a maximum of two of the three articulated rods included in the set of articulated rods are parallel. To prevent rotations of the platform 31 from arising when the third arm 15 is swinging, the line though those joints 29, 30C, 30 that connect the third set of articulated rods 20, 21, 21C to the platform 31 should be parallel to the line through those joints 28A, 28C, 28B that connect the third set of articulated rods 20, 21, 21C to the third arm 15 and at the same time parallel to the axis of rotation of the third arm 15 and the third actuator 12B. At the same time, this design will cause the platform 31 to rotate the third actuator 12A on the bearing 12A on the column 3, such that the third arm 15 will always swing in a plane that is perpendicular to the plane in which the first two arms 13, 14 are swinging, and, in addition, the third arm 15 will always be located midway between the first two arms 13, 14, which gives the robot a maximum working range.

It is also part of the invention that the third actuator 12C is mounted on another actuator 12D that is capable of rotating the third actuator around an axis that is essentially perpendicular to the axis of rotation of the second actuator 12D.

The inventive concept also comprises mounting at least two of the sets of articulated rods 16, 17; 18, 19 via said common joints 22, 25 on carriages 40, 41 and causing the manipulated platform 31 to move by controlling the positions of said carriages with the aid of actuators 10, 11. To avoid rotations of the platform 31, the two sets of articulated rods 16, 17; 18, 19 are mounted on the platform 31 via joints 23, 24; 26, 27 in such a way that a line, a lead line, through those joints 23, 24 that belong to one 16, 17 of the two sets of articulated rods becomes parallel to or coincides with a corresponding line, lead line, through those joints 26, 27 that belong to the other 18, 19 of the two sets of articulated rods. Further, said two carriages 40, 41 are suitably mounted such that the movements thereof are carried out in a plane perpendicular to the above-mentioned lead lines in a position when the platform 31 is approximately in the centre of its working range. To obtain a well utilized working range, the carriages should, in addition, move along mutually parallel paths.

It is also part of the inventive concept to design the third set of articulated rods 20, 21 either in the form of a parallelogram with two joints at each end of the articulated rod, or in the form of a parallelepiped with two joints at each end of the articulated rod, or in the form of an equilateral triangle, or in the form of three articulated rods, of which at most two may be parallel. The articulated rods 20, 21 included in the third set of articulated rods are mounted via joints 29,30 on the platform 31 such that a line through these joints becomes perpendicular to the parallel lines described above for the joints between the first two sets of articulated rods 16, 17; 18, 19 and the platform 31. In this way, rotation of the platform 31 is avoided when the platform is manipulated.

According to the invention, in order to obtain a larger working range of the embodiment of the robot exhibiting carriages 40, 41, 42, the third set of articulated rods 20, 21 may be mounted on a lever-arm arrangement 15, 46, 44, 45 connected to the second and third carriages 41, 42. The task of the lever-arm arrangement 45, 44, 46, 15 is to impart large movements to the set of articulated rods 20, 21 that is to move the manipulated platform 31 substantially perpendicular to the direction of movement of the carriages 40, 41, 42. Further, to obtain a maximum working range, the linear paths 3A, 3B, on which the carriages are moving, are parallel and mounted such that the linkages 16, 17; 18, 19; 20, 21 may move between the linear paths.

The inventive concept also comprises mounting on the manipulated platform 31 a wrist with one, two or three axes. It is also part of the inventive concept to use the robot as a slave robot to carry out different operations inside a more or less closed space 1. As a slave robot, the robot may also be used as a wrist for a larger robot, in which case the movements of the robot are synchronized to the movements of the larger robot.

The invention claimed is:

1. An industrial robot for moving an object in space, the industrial robot comprising:
 a stationary platform;
 a movable platform adapted for supporting the object;
 a first arm comprising a first supporting arm operatively connected to the stationary platform, a first actuator configured to rotate the first supporting arm about a first axis, and a first linkage operatively connected between the first supporting arm and the movable platform, wherein the first linkage comprises a triangle having a base that is journalled in the moveable platform;
 a second arm comprising a second supporting arm operatively connected to the stationary platform, a second actuator configured to rotate the second supporting arm about a second axis, and a second linkage operatively connected between the second supporting arm and the movable platform, wherein the second linkage comprises a triangle having a base that is journalled in the moveable platform; and
 a third arm comprising a third supporting arm operatively connected to the stationary platform, a third actuator configured to rotate the third supporting arm about a third axis, and a third linkage operatively connected between the third supporting arm and the movable platform,
 wherein the first axis and the second axis are parallel, and wherein the third supporting arm is journalled around a transverse axis that is arranged in a plane substantially normal to the second axis.

2. The industrial robot according to claim 1, wherein the second supporting arm comprises a bearing and is adapted to rotate in a plane intersecting the movable platform.

3. The industrial robot according to claim 1, wherein the third linkage comprises a triangle having a base that is journalled in the movable platform.

4. The industrial robot according to claim 1, wherein the third linkage comprises a locked double link.

5. An industrial robot for moving an object in space, the industrial robot comprising:
 a stationary platform;
 a movable platform adapted for supporting the object;
 a first arm comprising a first supporting arm operatively connected to the stationary platform, a first actuator configured to displace the first supporting arm along a first path, and a first linkage operatively connected between the first supporting arm and the movable platform, wherein the first linkage comprises a triangle having a base that is journalled in the moveable platform;
 a second arm comprising a second supporting arm operatively connected to the stationary platform, a second actuator configured to displace the second supporting arm along a second path, and a second linkage operatively connected between the second supporting arm and the movable platform, wherein the second linkage comprises a triangle having a base that is journalled in the moveable platform; and
 a third arm comprising a first supporting arm operatively connected to the stationary platform, a third actuator configured to displace the third supporting arm along a third path, and a third linkage operatively connected between the third supporting arm and the movable platform,
 wherein the first path and the second path are parallel, and wherein the third supporting arm is journalled around a transverse axis that is arranged at substantially a right angle to the second path.

* * * * *

UNITED STATES PATENT AND TRADEMARK OFFICE
CERTIFICATE OF CORRECTION

PATENT NO.        : 7,637,710 B2                                               Page 1 of 1
APPLICATION NO.   : 10/501554
DATED             : December 29, 2009
INVENTOR(S)       : Skutberg et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1172 days.

Signed and Sealed this

Ninth Day of November, 2010

David J. Kappos
*Director of the United States Patent and Trademark Office*